United States Patent [19]

Harrison

[11] Patent Number: 5,026,610
[45] Date of Patent: Jun. 25, 1991

[54] POLYMERIC FILMS

[75] Inventor: John Harrison, Bridgwater, England

[73] Assignee: Courtaulds Films & Packaging (Holdings) Ltd., England

[21] Appl. No.: 253,074

[22] Filed: Oct. 4, 1988

[30] Foreign Application Priority Data

Oct. 20, 1987 [GB] United Kingdom ............... 8724533

[51] Int. Cl.5 ............................................. B32B 27/08
[52] U.S. Cl. .................................... 428/516; 428/218; 428/515; 525/240
[58] Field of Search ...................... 428/516, 500, 349; 525/240

[56] References Cited

U.S. PATENT DOCUMENTS

| | | |
|---|---|---|
| 3,936,565 | 2/1976 | Good ................................... 428/516 |
| 4,151,318 | 4/1979 | Marshall .............................. 428/35 |
| 4,199,638 | 4/1980 | McKee ................................. 428/218 |
| 4,303,710 | 12/1981 | Bullard et al. ....................... 428/516 |
| 4,346,834 | 8/1982 | Mazumdar ........................... 428/516 |

FOREIGN PATENT DOCUMENTS

| | | |
|---|---|---|
| 0095299 | 11/1983 | European Pat. Off. . |
| 2029127 | 12/1970 | Fed. Rep. of Germany . |
| 2154624 | 5/1973 | France . |
| 4043274 | 9/1917 | Japan . |
| 1031251 | 2/1986 | Japan ................................. 428/516 |
| 1316640 | 5/1973 | United Kingdom . |
| 1368634 | 10/1974 | United Kingdom . |

*Primary Examiner*—Edith Buffalow
*Attorney, Agent, or Firm*—Bacon & Thomas

[57] ABSTRACT

The invention concerns polymeric films which can be used for twist wrap, for example for confectionery. Films of the invention have a layer of a blend of high density polyethylene with a polyethylene of lower density, a layer of high density polyethylene being provided on each surface of the blend. In general films of the invention will be produced by coextrusion and then uniaxially stretched in the machine direction. It has been possible to cut such films satisfactorily in a direction transverse to the direction of stretch using an oscillating cutter blade of the type used to cut films of reconstituted cellulose.

9 Claims, No Drawings

POLYMERIC FILMS

This invention concerns polymeric films and in particular synthetic polymer films which can be used for twist wrap, for example for confectionery.

It has been proposed hitherto to use synthetic polymers to produce films for twist wrap. High density polyethylene when formed into a film by melt extrusion followed by uniaxial stretching produces a film of high clarity and stiffness, but it has undesirable characteristics, in particular it has asymmetric tear strengths in the direction of stretch and perpendicular thereto. This leads to difficulty in cutting such films perpendicular to the direction of stretch if conventional twist wrap machinery is used, for example such as is used for films of reconstituted cellulose. Furthermore, such films have the disadvantage of tearing much more readily in the direction of stretch rather than perpendicular thereto. Attempts to tear such films tend to result in propagation of the tear along the direction of stretch of the film even when a tear is started by a cut perpendicular to the direction of stretch.

A proposal for reducing this asymmetry is the use of a blend of linear low density polyethylene with high density polyethylene. While this goes some way to reducing the disadvantages of films made from high density polyethylene, it does not sufficiently improve the ability to cut such films using cutting machinery designed for cutting films of reconstituted cellulose.

According to the present invention there is provided a polymeric film comprising a layer of a blend of high density polyethylene with a polyethylene of lower density than high density polyethylene, and a layer of high density polyethylene on each surface of the layer of the blend.

Films of the present invention have shown good physical properties as twist wrap. In particular, films have been produced which can be cut using cutting apparatus designed for films of reconstituted cellulose and which will not cut a hitherto proposed blend as described above.

It is preferred to use a blend of a high density polyethylene (HDPE) with a branched low density polyethylene (LDPE) and/or a medium density polyethylene (MDPE). Blends of HDPE with linear low density polyethylene (LLDPE) can also be used, such blends optionally including LDPE and/or MDPE.

preferred weight ratio of HDPE to LDPE and/or MDPE is from 20:80 to 80:20, more particularly from 40:60 to 60:40, and advantageously about 50:50.

The HDPE for the blend and/or the outer layers preferably has a melt flow index of not greater than 4 under ASTM 1238/73 at 190° C. and a pressure of 2.16 Kg per cm², preferably not greater than 1. The density of the HDPE is preferably from 0.94 to 0.97, more particularly from 0.95 to 0.96 g/cm³.

The polyethylene component having a density less than that of high density polyethylene will in general have a density of from 0.90 to 0.935 g/cm³. At densities of from 0.90 to 0.925 g/cm³ linear low density polyethylene (LLDPE) can be used. At densities of from 0.915 to 0.925, preferably about 0.92 g/cm³, LDPE can be used. Higher densities of from 0.925 to 0.935 g/cm³ can be provided by MDPE or MLLDPE.

The melt flow index of the polyethylene component having a density less than that of the HDPE of the blend is preferably from 0.5 to 2 under ASTM 1238/73 at 190° C. and a pressure of 2.16 KG/cm³.

The overall thickness of films of the present invention can be as required for a particular end use but they will usually be from 20 to 40 microns thick, for example about 30 microns thick.

Each layer of the films of the present invention is preferably approximately a third of the overall thickness of the film, for example a preferred film has outer layers of HDPE which are 9 microns thick with a core layer of the blend being 9 microns thick although other thickness ratios can be used depending, for example, on the desired physical properties of the film.

Films of the present invention are preferably produced by coextrusion of a core of the blend of polyethylene polymers with external layers of HDPE followed by stretching in the machine direction at elevated temperature, for example using heated rollers. The degree of stretch should be at least the natural draw ratio of the film which in general means by a ratio of at least 5.5:1, the upper limit of draw ratio preferably being about 7:1.

Films of the present invention can contain materials known in the art to achieve particular effects, for example they can contain antistatic agents, antiblock agents and/or slip agents. Surface coatings can also be used to achieve certain effects, for example antistatic agents can be applied in a surface coating.

The films can also contain pigments and/or be metallised, the latter for example being effected by vapour deposition or by lamination. Lamination can also be effected to other films if particular effects are desired.

The following Example is given by way of illustration only. All parts are by weight unless stated otherwise, and all melt flow index values are according to ASTM 1238/73 at 190° C. at 2.16 Kg/cm³ pressure.

EXAMPLE

A three layer polymer web was produced by coextruding two outer layers of HDPE on a core layer consisting of a blend of 50 percent of HDPE and 50 percent of LDPE. The HDPE in each case had a density of 0.952 g/cm³ and a melt flow index of 0.35. LDPE in the core had a density of 0.92 g/cm³ and a melt flow index of 0.5. The web was then stretched in the machine direction at a ratio of 6.5:1 using heated rolls.

The resulting film had a thickness of 27 microns with the core layer and each of the outer HDPE layers having a thickness of 9 microns.

The film was cut satisfactorily in the direction transverse to the direction of stretch using an oscillating cutter blade of the type used to cut films of reconstituted cellulose. The film also showed a considerably reduced tendency to tear along the direction of stretch when torn across the direction of stretch when compared with a film of a hitherto proposed blend of HDPE with LDPE.

What is claimed is:

1. A twist warp polymeric film comprising a layer of a blend of high density polyethylene with a polyethylene of lower density than high density polyethylene, and a layer of high density polyethylene on each surface of the layer of the blend, wherein the weight ratio of high density polyethylene to polyethylene of lower density than high density polyethylene in said blend is from 20:80 to 80:20.

2. A film according to claim 1, wherein the polyethylene of lower density than high density polyethylene is a member selected from the group consisting of a lower density polyethylene, a medium density polyethylene and mixtures thereof.

3. A film according to claim 1, wherein the weight ratio is from 40:60 to 60:40.

4. A film according to claim 3, wherein the weight ratio is about 50:50.

5. A film according to claim 1, wherein the high density polyethylene has a density of from 0.94 to 0.97 g/cm$^3$.

6. A film according to claim 1, wherein the high density polyethylene has a melt flow index of not greater than 4 under ASTM 1238/73 at 190° C. and a pressure of 2.16 Kg/cm$^2$.

7. A film according to claim 1, wherein the polyethylene of lower density than high density polyethylene has a density of from 0.90 to 0.935 g/cm$^3$.

8. A film according to claim 7, wherein the said density is from 0.915 to 0.925 g/cm$^3$.

9. A film according to claim 1, wherein the respective layers are of substantially the same thickness.

* * * * *